United States Patent [19]

Kuroda

[11] Patent Number: 5,768,167
[45] Date of Patent: Jun. 16, 1998

[54] TWO-DIMENSIONAL DISCRETE COSINE TRANSFORMATION CIRCUIT

[75] Inventor: Ichiro Kuroda, Tokyo, Japan

[73] Assignee: NEC Corporation, Tokyo, Japan

[21] Appl. No.: 659,345

[22] Filed: Jun. 6, 1996

[30] Foreign Application Priority Data

Jun. 6, 1995 [JP] Japan .................................... 7-139374

[51] Int. Cl.$^6$ .................................................. G06F 17/14
[52] U.S. Cl. .............................. 364/725.02; 364/725.03
[58] Field of Search .................................. 364/725–726, 364/725.02, 725.03

[56] References Cited

U.S. PATENT DOCUMENTS

| | | | |
|---|---|---|---|
| 5,408,425 | 4/1995 | Hou | 364/725 |
| 5,539,836 | 7/1996 | Babkin | 364/725 |
| 5,598,361 | 1/1997 | Nagamatsu et al. | 364/725 |

OTHER PUBLICATIONS

Loeffler et al., "Practical Fast 1–D DCT Algorithms with 11 Multiplications", Proce. of Intl. Cong. on Acoustics, Speech, and Signal Processing, (1989), pp. 988–991.

Kuroda et al., "Realization of Video Rate (inverse) DCT by 16–Bit General Purpose DSP", Paper of the Institute of Elec., Info. & Commun. Engineers, (1983), p. A–77.

Primary Examiner—Tan V. Mai
Attorney, Agent, or Firm—Foley & Lardner

[57] ABSTRACT

A two-dimensional discrete cosine transformation circuit performs 8 points×8 points two-dimensional discrete cosine transformation. The circuit comprises a first stage calculation circuit, a second stage calculation circuit, and a third stage calculation circuit. The first stage calculation circuit includes sixteen two-dimensional butterfly computing circuits. The second stage calculation circuit includes four two-dimensional butterfly computing circuits, eight first one-dimensional butterfly computing circuits and eight second one-dimensional butterfly computing circuits. The third stage calculation circuit includes nine tensor product computing elements.

7 Claims, 3 Drawing Sheets

CORRESPONDENCE OF 8 (DOTS) × 8 (DOTS) OF
TWO DIMENSIONAL REGION AND ADDRESS

| 00 | 01 | 02 | 03 | 04 | 05 | 06 | 07 |
|----|----|----|----|----|----|----|----|
| 10 | 11 | 12 | 13 | 14 | 15 | 16 | 17 |
| 20 | 21 | 22 | 23 | 24 | 25 | 26 | 27 |
| 30 | 31 | 32 | 33 | 34 | 35 | 36 | 37 |
| 40 | 41 | 42 | 43 | 44 | 45 | 46 | 47 |
| 50 | 51 | 52 | 53 | 54 | 55 | 56 | 57 |
| 60 | 61 | 62 | 63 | 64 | 65 | 66 | 67 |
| 70 | 71 | 72 | 73 | 74 | 75 | 76 | 77 |

TWO-DIMENSIONAL DISCRETE COSINE TRANSFORMATION CIRCUIT

BACKGROUND OF THE INVENTION

1. Field of the Invention

The present invention relates to a circuit for realizing two-dimensional discrete cosine transformation (DCT) employed in an image signal processing and so forth.

2. Description of the Related Art

Conventionally, when 8 points×8 points DCT to be employed in an image signal processing, a circuit is designed for minimizing the number of times multiplying and multiplication and addition operation are performed which require greater periods of time and/or additional hardware.

Two-dimensional DCT of 8 points ×8 points is realized by performing a one-dimensional 8 point DCT eight times in a row direction, and performing a one-dimensional 8 point DCT eight times in a column direction utilizing the results in one-dimensional DCT in the row direction. By increasing the speed of the one-dimensional 8 point DCT, an increase in speed of the two-dimensional DCT is intended to be achieved.

A technique for performing the one-dimensional 8 point DCT has been disclosed in Proceedings of International Conference on Acoustics, Speech, and Signal Processing 1989 (ICASSP-89), pp 988 –991, C. Loeffler et al. "*Practical Fast 1-D DCT Algorithms with 11 Multiplications*", for example.

As a result of the progressive improvement of the performance of microprocessor and signal processors, it has become possible to perform image signal processing by means of these processors.

In Kuroda et al., "*Realization of Video Rate (inverse) DCT by 16-bit General Purpose DSP*", Paper of The Institute of Electronics, Information and Communication Engineers, National Convention in Fall, p A-77, there is proposed a technique whereby, since addition subtraction and multiplication operations can be performed with a microprocessor or signal processor, even for a high speed algorithm, add also the overall number of times which arithmetic operations are performed and is minimized.

The content of the inverse DCT algorithm by Kuroda et al in the above-identified paper is now summarized.

With respect to respective coefficients of N order inverse DCT matrix $R=\gamma_{i,j}$ (i,j=0,..., N–1), $\gamma_{i,j}=(-1)^j \gamma_{N-i-1,j}$ can be established. From this, an 8 point inverse DCT can be realized from the following equations (1) to (3). Here, $X_0$ to $X_7$ and $y_0$ to $y_7$ are respectively input and output vectors.

$$\begin{pmatrix} s_0 \\ s_2 \\ s_4 \\ s_6 \end{pmatrix} = \begin{pmatrix} \gamma_{0,0} & \gamma_{0,2} & \gamma_{0,4} & \gamma_{0,6} \\ \gamma_{1,0} & \gamma_{1,2} & \gamma_{1,4} & \gamma_{1,6} \\ \gamma_{2,0} & \gamma_{2,2} & \gamma_{2,4} & \gamma_{2,6} \\ \gamma_{3,0} & \gamma_{3,2} & \gamma_{3,4} & \gamma_{3,6} \end{pmatrix} \begin{pmatrix} x_0 \\ x_2 \\ x_4 \\ x_6 \end{pmatrix} \quad (1)$$

$$\begin{pmatrix} s_1 \\ s_3 \\ s_5 \\ s_7 \end{pmatrix} = \begin{pmatrix} \gamma_{0,1} & \gamma_{0,3} & \gamma_{0,5} & \gamma_{0,7} \\ \gamma_{1,1} & \gamma_{1,3} & \gamma_{1,5} & \gamma_{1,7} \\ \gamma_{2,1} & \gamma_{2,3} & \gamma_{2,5} & \gamma_{2,7} \\ \gamma_{3,1} & \gamma_{3,3} & \gamma_{3,5} & \gamma_{3,7} \end{pmatrix} \begin{pmatrix} x_1 \\ x_3 \\ x_5 \\ x_7 \end{pmatrix} \quad (2)$$

$$\begin{pmatrix} y_0 \\ y_1 \\ y_2 \\ y_4 \end{pmatrix} = \begin{pmatrix} s_0 + s_1 \\ s_2 + s_3 \\ s_4 + s_5 \\ s_6 + s_7 \end{pmatrix} \begin{pmatrix} y_4 \\ y_5 \\ y_6 \\ y_7 \end{pmatrix} = \begin{pmatrix} s_6 - s_7 \\ s_4 - s_5 \\ s_2 - s_3 \\ s_0 - s_1 \end{pmatrix} \quad (3)$$

The vector multiplication in the foregoing equation 81) can be realized by the following equations (4) and (5):

$$\begin{pmatrix} t_0 \\ t_2 \end{pmatrix} = \begin{pmatrix} \gamma_{0,0} & \gamma_{0,4} \\ \gamma_{1,0} & \gamma_{1,4} \end{pmatrix} \begin{pmatrix} x_0 \\ x_4 \end{pmatrix} \begin{pmatrix} t_1 \\ t_3 \end{pmatrix} = \begin{pmatrix} \gamma_{0,2} & \gamma_{0,6} \\ \gamma_{1,2} & \gamma_{1,6} \end{pmatrix} \begin{pmatrix} x_2 \\ x_6 \end{pmatrix} \quad (4)$$

$$\begin{pmatrix} s_0 \\ s_2 \end{pmatrix} = \begin{pmatrix} t_0 + t_1 \\ t_2 + t_3 \end{pmatrix} \begin{pmatrix} s_4 \\ s_6 \end{pmatrix} = \begin{pmatrix} t_2 - t_3 \\ t_0 + t_1 \end{pmatrix} \quad (5)$$

The first element of the foregoing equation (4) can be realized by one multiplication and two product summing operations.

While the foregoing algorithm is directed to inverse DCT algorithm, it is naturally applicable for DCT in positive direction.

When a two-dimensional DCT is performed with a microprocessor or a signal processor, the result of a one-dimensional DCT in a row direction is temporarily stored due to the limitation in the number of registers, and one-dimensional DCT in the column direction is executed by reading out from the register. Also, the result of the one-dimensional DCT in the column direction is stored in a memory.

Since multiplication is performed upon execution of the one-dimensional DCT in a row direction, the result of the one-dimensional DCT in a row direction becomes double precision. In order to avoid introduction of error, it becomes necessary to store in the memory and subsequently perform one-dimensional DCT in a column direction in double precision. However, because the amount of calculation and/or the amount of hardware becomes large for performing calculation in double precision, it is typical in the prior art to perform calculation for double precision data in single precision, thereby introducing error.

On the other hand, when 64×64 matrix vector multiplication by direct 8×8 two-dimensional DCT is performed, introduction of error can be avoided. However, the amount of calculation becomes huge.

SUMMARY OF THE INVENTION

It is an object of the present invention to realize high speed two-dimensional DCT while restricting the total number of multiplication and addition operations in a two-dimensional DCT calculation, and while avoiding the introduction of calculation error.

According to the first aspect of the invention, a two-dimensional discrete cosine transformation circuit for performing 8 points×8 points two-dimensional discrete cosine transformation, comprises:

assuming i (an integer from 0 to 7) as an address in vertical direction and j (an integer from 0 to 7) as an address in horizontal direction, and taking a point storing input data and intermediate data as (i, j), with respect to all of combinations with assumption that i is 0 to 3 and j is 0 to 3, in a first stage calculation means constituted of sixteen in number of two-dimensional butterfly computing circuits taking (i, j) as the first input of the first butterfly computing circuit, (i, 7–j) as the second input of the first butterfly computing circuit, (7–i, j) as the first input of the second butterfly computing circuit and (7−i, 7−j) as the second input of the second butterfly computing circuit, a second stage calculation means taking the output of the first stage as input of the second stage constituted of four in number of two-dimensional butterfly circuit taking (4i, 4j) as a first input of the first butterfly computing circuit, (4i, 4j+2) as a second input of the first butterfly computing circuit, (4i+1, 4j) as a first input of the second butterfly computing circuit and (4i+2, 4j+2) as a second input of the second butterfly computing circuit, with respect to all combination for i taken as 0 to 1 and i taken as o to 1, eight in number of one-dimensional butterfly circuits taking (4i, 2j+1) as the first input and (4i +2, 2j+1) as the second input, with respect to all of combinations taking i from 0 or 1 and j from 0 to 3, and eight in number of one-dimensional butterfly circuits taking (2i+1, 4j) as the first input and (2i +1, 4j+2) as the second input, with respect to all combinations of i from 0 to 3 and j from 0 or 1, a third stage calculation means taking the output of the second stage as input of the third stage constituted of a first tensor product computing element taking (0, 0), (0, 4), (4, 0), (4, 4) as input, and performs matrix vector calculation in 4×4 matrix as tensor product of the first 2×2 coefficient matrix and the first 2×2 coefficient matrix, a second tensor product computing element taking (0, 2), (0, 6), (4, 2), (4, 6) as input, and performs matrix vector calculation in 4×4 matrix as tensor product of the first 2×2 coefficient matrix and the second 2×2 coefficient matrix, a third tensor product computing element taking (2, 0), (2, 4), (6, 0), (6, 4) as input, and performs matrix vector calculation in 4×4 matrix as tensor product of the second 2×2 coefficient matrix and the first 2×2 coefficient matrix, a fourth tensor product computing element taking (2, 2), (2, 6), (6, 2), (6, 6) as input, and performs matrix vector calculation in 4×4 matrix as tensor product of the second 2×2 coefficient matrix and the second 2×2 coefficient matrix, a fifth tensor product computing element taking (0, 1), (0, 3), (0, 5), (0, 7), (4, 1), (4, 3), (4, 5), (4, 7) as input, and performs matrix vector calculation in 8×8 matrix as tensor product of the first 2×2 coefficient matrix and the first 4×4 coefficient matrix, a sixth tensor product computing element taking (2, 1), (2, 3), (2, 5), (2, 7), (6, 1), (6, 3), (6, 5), (6, 7) as input, and performs matrix vector calculation in 8×8 matrix as tensor product of the second 2×2 coefficient matrix and the first 4×4 coefficient matrix, a seventh tensor product computing element taking (1, 0), (1, 4), (3, 0), (3, 4), (5, 0), (5, 4), (7, 0), (7, 4) as input, and performs matrix vector calculation in 8×8 matrix as tensor product of the first 4×4 coefficient matrix and the first 2×2 coefficient matrix, an eighth tensor product computing element taking (1, 2), (1, 6), (3, 2), (3, 6), (5, 2), (5, 6), (7, 2), (7, 6) as input, and performs matrix vector calculation in 8×8 matrix as tensor product of the first 4×4 coefficient matrix and the second 2×2 coefficient matrix, and a ninth tensor product computing element taking (1, 1), (1, 3), (1, 5), (1, 7), (3, 1), (3, 3), (3, 5), (3, 7), (5, 1), (5, 3), (5, 5), (5, 7), (7, 1), (7, 3), (7, 5), (7, 7) as input, and performs matrix vector calculation in 16×16 matrix as tensor product of the first 4×4 coefficient matrix and the first 4×4 coefficient matrix.

Preferably, a one-dimensional butterfly computing circuit has two inputs to output a result of addition of a first input and a second input as a first output and a result of subtraction of the second input from the first input as a second output, and a two-dimensional butterfly computing circuit includes a first butterfly computing circuit, a second butterfly computing circuit, a third butterfly computing circuit taking the first output of the first butterfly computing circuit as the first input and the first output of the second butterfly computing circuit, and a fourth butterfly computing circuit taking the second output of the first butterfly computing circuit as the first input and the second output of the second butterfly computing circuit as the second input.

A computing element may input a lexicographical order of n×m in number of rectangular regions (i, j) and multiplying nm matrix as tensor products of n×n matrix and m×m matrix. Permutation networks may be connected between the first stage calculation means, the second stage calculation means and the third stage calculation means.

According to the second aspect of the invention, a two-dimensional discrete cosine transformation circuit for performing 8 points×8 points two-dimensional discrete cosine transformation, comprises:

first stage calculation means, second stage calculation means taking output of said first stage calculation means as input, and third stage calculation means taking output of said second stage calculation means as input, said first stage calculation means including sixteen in number of two-dimensional butterfly computing circuits, each of said two-dimensional butterfly computing circuit including first and second butterfly computing circuits taking a result of addition of a first input and a second input as a first output and a result of subtraction of said second input from said first input as a second output, a third butterfly computing circuit taking the first output of the first butterfly computing circuit as the first input and the first output of the second butterfly computing circuit as the second input, and taking a result of addition of a first input and a second input as a first output and a result of subtraction of said second input from said first input as a second output, and a fourth butterfly computing circuit taking the second output of the first butterfly computing circuit as the first input and the second output of the second butterfly computing circuit as the second input and taking a result of addition of a first input and a second input as a first output and a result of subtraction of said second input from said first input as a second output, said first output of the third butterfly computing circuit being taken as the first output, said first output of the fourth butterfly computing circuit being taken as the second output, said second output of the third butterfly computing circuit being taken as a third output, and said second output of the fourth butterfly computing circuit being taken as a fourth output, assuming i (an integer from 0 to 7) as an address in vertical direction and j (an integer from 0 to 7) as an address in horizontal direction, and taking a point storing input data and intermediate data as (i, j), with respect to all of combinations with assumption that i is 0 to 3 and j is 0 to 3, in a first stage calculation means constituted of sixteen in number of two-dimensional butterfly computing circuits taking (i, j) as the first input of the first butterfly computing circuit, (i, 7−j) as the second input of the first butterfly computing circuit, (7−i, j) as the first input of the second butterfly computing circuit and (7−i, 7−j) as the second input of the second butterfly computing circuit, said first output being stored in (i, j), said second output being stored in (i, 7−j), said third output being stored in (7−i, j) and said fourth output being stored in (7−i, 7−j), said second stage calculation means includes four in number of two-dimensional butterfly computing circuits, eight in number of first one-dimensional butterfly computing circuits and eight in number of second one-dimensional butterfly computing circuits, each of said two-dimensional butterfly circuit including first and second butterfly computing circuits, with respect to all combination for i taken as 0 to 1 and j taken as 0 to 1, (4i, 4j) being taken as a first input of said first butterfly computing circuit, (4i, 4j+2) being taken as a second input of said first butterfly computing circuit, (4i+2, 4j) being taken as a first input of said second butterfly computing circuit and (4i+2, 4j+2) as a second input of said second butterfly computing circuit, each of said first butterfly computing circuits taking (4i, 2j+1) as the first input and (4i +2, 2j+1) as the second input, with respect to all of combinations taking i from 0 or 1 and j from 0 to 3 and storing a first output in (4i, 2j+1) and a second output in (4i+2, 2j+1), each of said second butterfly computing circuits taking (2i+1, 4j) as the first input and (2i +1, 4j+2) as the second input, with respect to all combinations of i from 0 to 3 and j from 0 or 1, and storing a first output in (2i+1, 4j) and a second output in (2i+1, 4j+2), a third stage calculation means taking the output of the second stage as input of the third stage calculation means constituted of a first tensor product computing element taking (0, 0), (0, 4), (4, 0), (4, 4) as input, and performs matrix vector calculation in 4×4 matrix as tensor product of the first 2×2 coefficient matrix and the first 2×2 coefficient matrix, a second tensor product computing element taking (0, 2), (0, 6), (4, 2), (4, 6) as input, and performs matrix vector calculation in 4×4 matrix as tensor product of the first 2×2 coefficient matrix and the second 2×2 coefficient matrix, a third tensor product computing element taking (2, 0), (2, 4), (6, 0), (6, 4) as input, and performs matrix vector calculation in 4×4 matrix as tensor product of the second 2×2 coefficient matrix and the first 2×2 coefficient matrix, a fourth tensor product computing element taking (2, 2), (2, 6), (6, 2), (6, 6) as input, and performs matrix vector calculation in 4×4 matrix as tensor product of the second 2×2 coefficient matrix and the second 2×2 coefficient matrix, a fifth tensor product computing element taking (0, 1), (0, 3), (0, 5), (0, 7), (4, 1), (4, 3), (4, 5), (4, 7) as input, and performs matrix vector calculation in 8×8 matrix as tensor product of the first 2×2 coefficient matrix and the first 4×4 coefficient matrix, a sixth tensor product computing element taking (2, 1), (2, 3), (2, 5), (2, 7), (6, 1), (6, 3), (6, 5), (6, 7) as input, and performs matrix vector calculation in 8×8 matrix as tensor product of the second 2×2 coefficient matrix and the first 4×4 coefficient matrix, a seventh tensor product computing element taking (1, 0), (1, 4), (3, 0), (3, 4), (5, 0), (5, 4), (7, 0), (7, 4) as input, and performs matrix vector calculation in 8×8 matrix as tensor product of the first 4×4 coefficient matrix and the first 2×2 coefficient matrix, an eighth tensor product computing element taking (1, 2), (1, 6), (3, 2), (3, 6), (5, 2), (5, 6), (7, 2), (7, 6) as input, and performs matrix vector calculation in 8×8 matrix as tensor product of the first 4×4 coefficient matrix and the second 2×2 coefficient matrix, and a ninth tensor product computing element taking (1, 1), (1, 3), (1, 5), (1, 7), (3, 1), (3, 3), (3, 5), (3, 7), (5, 1), (5, 3), (5, 5), (5, 7), (7, 1), (7, 3), (7, 5), (7, 7) as input, and performs matrix vector calculation in 16×16 matrix as tensor product of the first 4×4 coefficient matrix and the first 4×4 coefficient matrix.

According to the third aspect of the invention, a two-dimensional discrete cosine transformation process for performing 8 points×8 points two-dimensional discrete cosine transformation, comprises:

first stage calculation step for performing predetermined calculation, second stage calculation step taking output of said first stage calculation step as input, and third stage calculation step taking output of said second stage calculation step as input, said first stage calculation step consisted of first to sixteenth two-dimensional computing steps, with assuming i (an integer from 0 to 7) as an address in vertical direction and j (an integer from 0 to 7) as an address in horizontal direction, and taking a point storing input data and intermediate data as (i, j), with respect to all of combinations with assumption that i is 0 to 3 and j is 0 to 3, in a first stage calculation means constituted of sixteen in number of two-dimensional butterfly computing steps taking (i, j) as the first input of the first butterfly computing step, (i, 7−j) as the second input of the first butterfly computing step, (7−i, j) as the first input of the second butterfly computing step and (7−i, 7−j) as the second input of the second butterfly computing step, a second stage calculation steps taking the output of the first stage as input of the second stage consisted of first to fourth of two-dimensional butterfly computing steps taking (4i, 4j) as a first input of the first butterfly computing, (4i, 4j+2) as a second input of the first butterfly computing, (4i+2, 4j) as a first input of the second butterfly computing and (4i +2, 4j+2) as a second input of the second butterfly computing, with respect to all combination for i taken as 0 to 1 and j taken as o to 1, first to eighth one-dimensional butterfly computing steps taking (4i, 2j+1) as the first input and (4i+2, 2j+1) as the second input, with respect to all of combinations taking i from 0 or 1 and j from 0 to 3, and storing a first output in (4i, 2j+1) and a second output in (4i+2, 2j+1)

first to eighth one-dimensional butterfly circuits taking (2i+1, 4j) as the first input and (2i combinations of i from 0 to 3 and j from 0 or 1, and storing a first output in (2i+1, 4j) and a second output in (2i+1, 4j+2)

a third stage calculation step taking the output of the second stage as input of the third stage constituted of a first tensor product computing step taking (0, 0), (0, 4), (4, 0), (4, 4) as input, and performs matrix vector calculation in 4×4 matrix as tensor product of the first 2×2 coefficient matrix and the first 2×2 coefficient matrix, a second tensor product computing step taking (0, 2), (0, 6), (4, 2), (4, 6) as input, and performs matrix vector calculation in 4×4 matrix as tensor product of the first 2×2 coefficient matrix and the second 2×2 coefficient matrix, a third tensor product computing step taking (2, 0), (2, 4), (6, 0), (6, 4) as input, and performs matrix vector calculation in 4×4 matrix as tensor product of the second 2×2 coefficient matrix and the first 2×2 coefficient matrix, a fourth tensor product computing step taking (2, 2), (2, 6), (6, 2), (6, 6) as input, and performs matrix vector calculation in 4×4 matrix as tensor product of the second 2×2 coefficient matrix and the second 2×2 coefficient matrix, a fifth tensor product computing step taking (0, 1), (0, 3), (0, 5), (0, 7), (4, 1), (4, 3), (4, 5), (4, 7) as input, and performs matrix vector calculation in 8×8 matrix as tensor product of the first 2×2 coefficient matrix and the first 4×4 coefficient matrix, a sixth tensor product computing step taking (2, 1), (2, 3), (2, 5), (2, 7), (6, 1), (6, 3), (6, 5), (6, 7) as input, and performs matrix vector calculation in 8×8 matrix as tensor product of the second 2×2 coefficient matrix and the first 4×4 coefficient matrix, a seventh tensor product computing step taking (1, 0), (1, 4), (3, 0), (3, 4), (5, 0), (5, 4), (7, 0), (7, 4) as input, and performs matrix vector calculation in 8×8 matrix as tensor product of the first 4×4 coefficient matrix and the first 2×2 coefficient matrix, an eighth tensor product computing step taking (1, 2), (1, 6), (3, 2), (3, 6), (5, 2), (5, 6), (7, 2), (7, 6) as input, and performs matrix vector calculation in 8×8 matrix as tensor product of the first 4×4 coefficient matrix and the second 2×2 coefficient matrix, and a ninth tensor product computing step taking (1, 1), (1, 3), (1, 5), (1, 7), (3, 1), (3, 3), (3, 5), (3, 7), (5, 1), (5, 3), (5, 5), (5, 7), (7, 1), (7, 3), (7, 5), (7, 7) as input, and performs matrix vector calculation in 16×16 matrix as tensor product of the first 4×4 coefficient matrix and the first 4×4 coefficient matrix.

In the third aspect of the invention, a one-dimensional butterfly calculation may containing two inputs may to output a result of addition of a first input and a second input as a first output and a result of subtraction of the second input from the first input as a second output, and a two-dimensional butterfly calculation may include a first butterfly calculation, a second butterfly calculation, a third butterfly calculation taking the first output of the first butterfly calculation as the first input and the first output of the second butterfly calculation, and a fourth butterfly calculation taking the second output of the first butterfly calculation as the first input and the second output of the second butterfly calculation as the second input.

Further objects, features and effects of the present invention will become apparent from the detailed description given hereinafter.

BRIEF DESCRIPTION OF THE DRAWINGS

The present invention will be understood more fully from the detailed description given herebelow and from the accompanying drawings of the preferred embodiment of the invention, which, however, should not be taken to limit the present invention, but are for explanation and understanding only.

In the drawings.

DESCRIPTION OF THE PREFERRED EMBODIMENT

The preferred embodiment of a two-dimensional discrete cosine transformation circuit according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail.

At first, discussion will be given for a principle of the present invention.

The foregoing 8 point one-dimensional DCT algorithm by Kuroda et al. can be described as transformation of an 8×8 matrix as expressed by the following equation (1).

$$R = P \cdot \begin{pmatrix} A_0 & 0 \\ 0 & A_2 \end{pmatrix} \cdot \begin{pmatrix} B_4 & 0 \\ 0 & I_4 \end{pmatrix} \cdot B_3 - P \cdot \begin{pmatrix} A_0 B_4 & 0 \\ 0 & A_3 \end{pmatrix} \cdot B_3 \quad (1)$$

Here, $$A_0 = \begin{pmatrix} A_1 & 0 \\ 0 & A_2 \end{pmatrix}$$

wherein $$A_1 = \begin{pmatrix} \gamma(1) & \gamma(1) \\ \gamma(1) & -\gamma(1) \end{pmatrix} = \frac{1}{2\sqrt{2}} \begin{pmatrix} 1 & 1 \\ 1 & -1 \end{pmatrix}$$

$$A_2 = \begin{pmatrix} \gamma(2) & \gamma(6) \\ \gamma(6) & -\gamma(2) \end{pmatrix}$$

$$A_3 = \begin{pmatrix} \gamma(1)\gamma(3)\gamma(5)\gamma(7) \\ \gamma(3)-\gamma(7)-\gamma(1)-\gamma(5) \\ \gamma(5)-\gamma(1)\gamma(7)\gamma(3) \\ \gamma(7)-\gamma(5)\gamma(3)-\gamma(1) \end{pmatrix}$$

On the other hand, P is cyclic matrix, $B_4$ and $B_8$ are butterfly matrix. Also, $\gamma(k) = \cos 2\pi k/32$.

At this time, a two-dimensional DCT matrix (64 ×64) becomes tensor product (Kronecker product) of a one-dimensional DCT matrix (8×8)as shown by the following equation (2).

In the following discussion, ⊗ represents the tensor product, and the tensor product A⊗B of the matrix $A=(a_{ij})$ and $B=(b_{ij})$ is expressed by $(a_{ij}B)$.

$$R \otimes R - P \cdot \begin{pmatrix} A_0 B_4 & 0 \\ 0 & A_3 \end{pmatrix} \cdot B_8 \otimes P \cdot \begin{pmatrix} A_0 B_4 & 0 \\ 0 & A_3 \end{pmatrix} \cdot B_8 \quad (2)$$

This can be re-written as shown in the following equation (3). Here, P1 and P2 are cyclic matrices.

$$\begin{aligned}
R \otimes R &= P \otimes P \cdot \begin{pmatrix} A_0 B_4 & 0 \\ 0 & A_3 \end{pmatrix} \otimes \begin{pmatrix} A_0 B_4 & 0 \\ 0 & A_3 \end{pmatrix} \cdot B_8 \otimes B_8 \\
&= P \otimes P \cdot P1 \cdot \begin{pmatrix} A_0 B_4 \otimes A_0 B_4 & 0 & 0 & 0 \\ 0 & A_0 B_4 \otimes A_3 I & 0 & 0 \\ 0 & 0 & A_3 I \otimes A_0 B_4 & 0 \\ 0 & 0 & 0 & A_8 \otimes A_3 \end{pmatrix} \cdot B_8 \otimes B_8 \\
&= P2 \cdot \begin{pmatrix} A_0 \otimes A_4 \cdot B_4 \otimes B_4 & 0 & 0 & 0 \\ 0 & A_0 \otimes A_3 \cdot B_4 \otimes I & 0 & 0 \\ 0 & 0 & A_3 \otimes A_0 \cdot I \otimes B_4 & 0 \\ 0 & 0 & 0 & A_8 \otimes A_3 \end{pmatrix} \cdot B_8 \otimes B_8
\end{aligned} \quad (3)$$

As set forth above, the two-dimensional DCT matrix becomes a 64×64 butterfly matrix, four 16×16 matrices and multiplication of a cyclic matrix. It should be noted that multiplication of the cyclic matrix is equivalent to the exchanging of data. When the multiplication of cyclic matrix is realized by the processor, it can be realized by addressing the general purpose register. Therefore, it may not be counted as a calculation amount. Respective of the 16×16 matrix can be resolved as shown in the following equation (4).

$$\begin{aligned}
A_0 \otimes A_0 &= \begin{pmatrix} A_1 & 0 \\ 0 & A_2 \end{pmatrix} \otimes \begin{pmatrix} A_1 & 0 \\ 0 & A_3 \end{pmatrix} \\
&= P \begin{pmatrix} A_1 \otimes A_1 & 0 & 0 & 0 \\ 0 & A_1 \otimes A_2 & 0 & 0 \\ 0 & 0 & A_2 \otimes A_1 & 0 \\ 0 & 0 & 0 & A_2 \otimes A_2 \end{pmatrix}
\end{aligned} \quad (4)$$

$$A_0 \otimes A_3 = \begin{pmatrix} A_1 & 0 \\ 0 & A_2 \end{pmatrix} \otimes A_3 = P \begin{pmatrix} A_1 \otimes A_3 & 0 \\ 0 & A_2 \otimes A_3 \end{pmatrix}$$

$$A_3 \otimes A_0 = A_2 \otimes \begin{pmatrix} A_1 & 0 \\ 0 & A_2 \end{pmatrix} \otimes A_3 = P \begin{pmatrix} A_3 \otimes A_1 & 0 \\ 0 & A_3 \otimes A_2 \end{pmatrix}$$

$A_1 \otimes A_1$ is $4 \otimes 4$ matrix
$A_1 \otimes A_2$ is $4 \otimes 4$ matrix
$A_2 \otimes A_1$ is $4 \otimes 4$ matrix
$A_2 \otimes A_2$ is $4 \otimes 4$ matrix
$A_1 \otimes A_3$ is $8 \otimes 8$ matrix
$A_3 \otimes A_1$ is $8 \otimes 8$ matrix
$A_2 \otimes A_3$ is $8 \otimes 8$ matrix
$A_3 \otimes A_3$ is $8 \otimes 8$ matrix
$A_3 \otimes A_3$ is $16 \otimes 16$ matrix From the foregoing, in the third stage of matrix vector multiplication which requires multiplication, it becomes unnecessary to input the double precision data as the result of multiplication for multiplication or to store in the memory.

On the other hand, the total of number multiplication, addition, and subtraction operations becomes 768, the sum of 128 in the first stage, 64 in the second stage and in the third stage. This total number is greater than the expression method by Kuroda et al., in which introduction of error by employing resolving of the matrix. However, the total number is smaller than the 4092 operations which are required for a 64×64 matrix calculation.

Next, the preferred embodiment of a two-dimensional discrete cosine transformation circuit according to the present invention will be discussed with reference to the accompanying drawings.

Figure 1A:
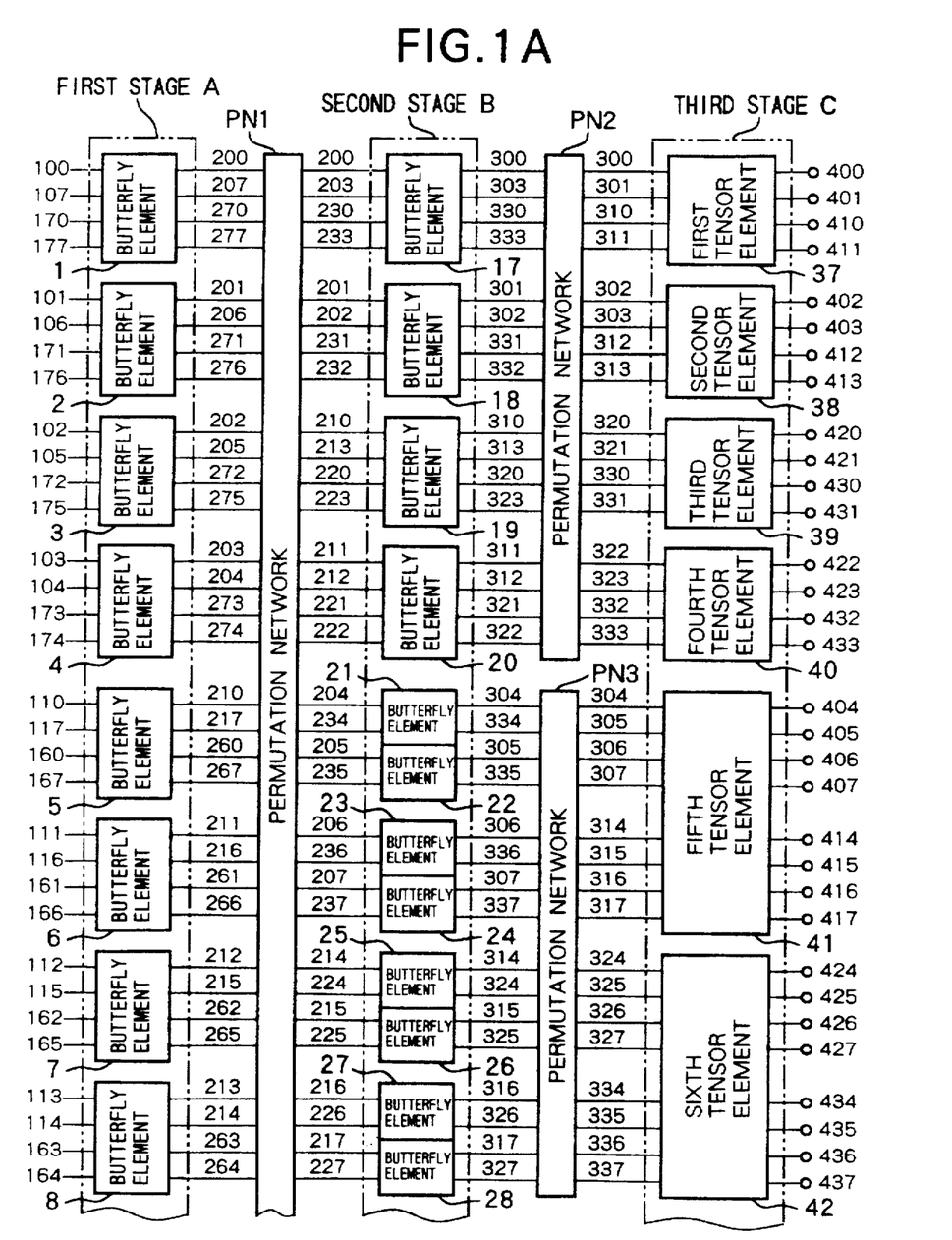
FIGS. 1A and 1B are circuit diagrams showing a construction of the first embodiment of an 8 points×8 points two-dimensional DCT circuit according to the present invention.
Figure 1B:
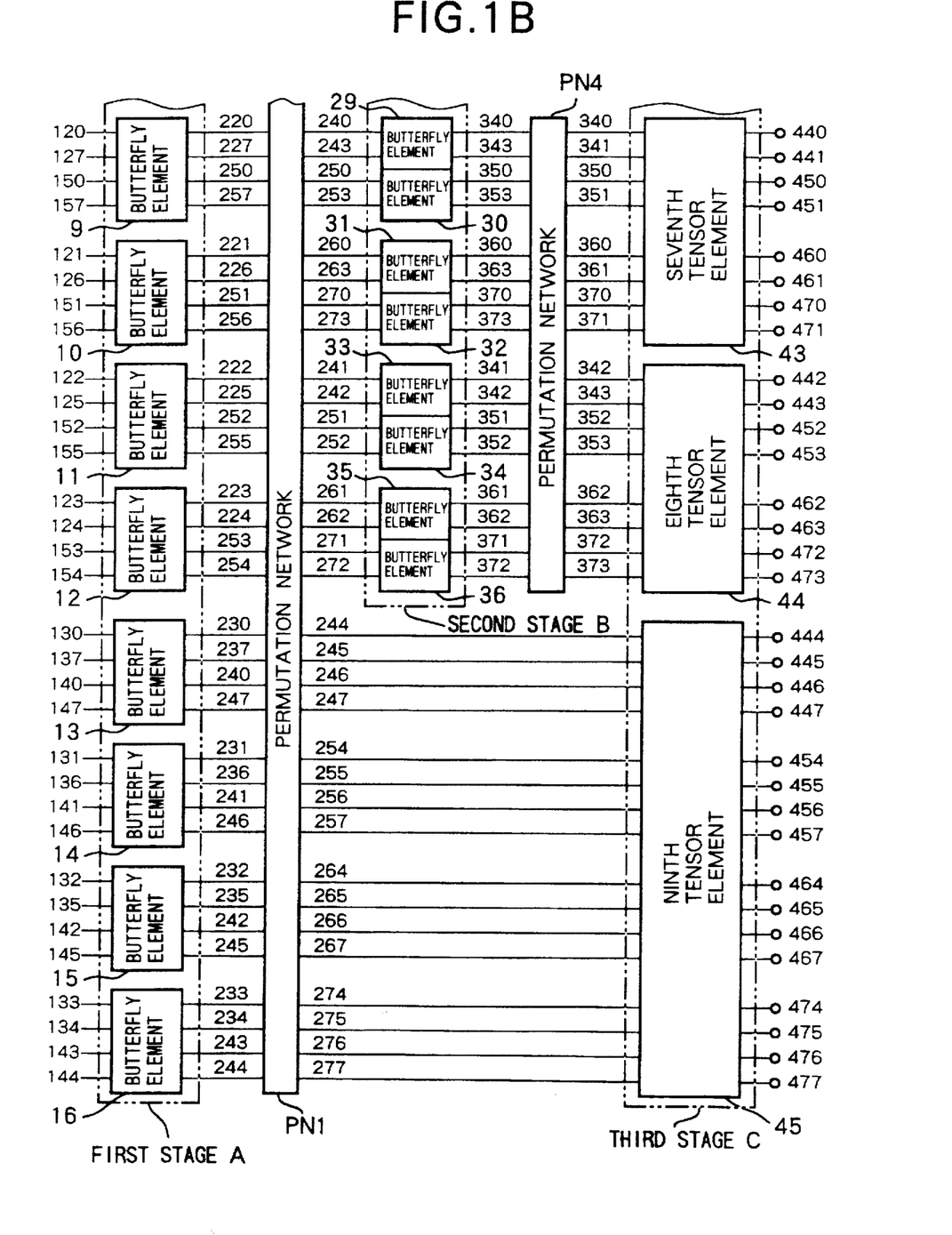

FIG. 1 is a circuit for calculating an 8 points ×8 points two-dimensional DCT in accordance with the first embodiment of the present invention.

FIG. 1 is constructed with a first stage A constructed with two-dimensional butterfly computing elements 1 to 16, a second stage B constructed with two-dimensional butterfly computing elements 17 to 20 and butterfly computing elements 21 to 36, and a third stage C constructed with first tensor product computing element 37, a second tensor product computing element 38, a third tensor product computing element 39, a fourth tensor product computing element 40, a fifth tensor product computing element 41, a sixth tensor product computing element 42, a seventh tensor product computing element 43, an eighth tensor product computing element 44 and a ninth tensor product computing element 45.

In FIG. 1, the first, second and third stages A, B and C are connected by permutation networks PN1, PN2, PN3 and PN4.

Here, in the circuit calculating 8 points×8 points two-dimensional DCT, i and j are assumed as integer from 0 to 7, i is assumed as an address in vertical direction, and j is assumed as an address in horizontal direction. A respective storage address of i and j is designated as (i, j). On the other hand, the number of each input in FIG. 1 is assumed as 1ij.

Figure 2:
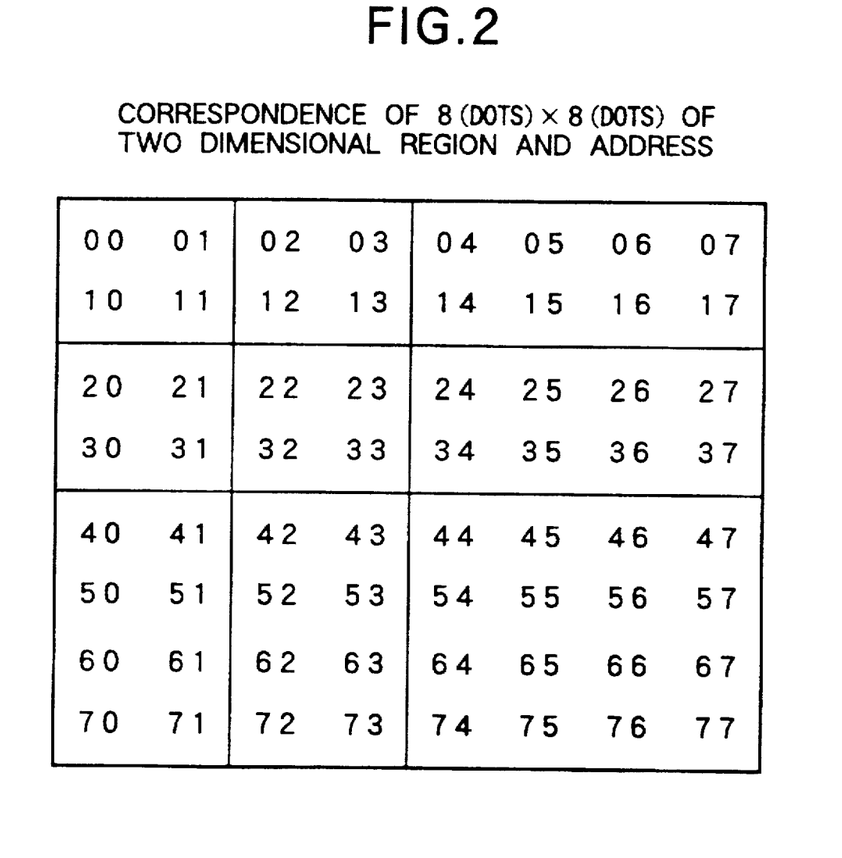
FIG. 2 is an illustration showing correspondence between an 8 points×8 points two-dimensional region and an address in the shown embodiment.

FIG. 2 shows the correspondence of 8 points×8 points of a two dimensional region and an address.

The one-dimensional butterfly computing circuit has two inputs to output a result of addition of a first input and a second input as a first output and a result of subtraction of the second input from the first input as a second output. In the one-dimensional butterfly computing circuit, when the first input is assumed as (i1, j1), the first output is stored in (i1, j1) and when the second input is assumed as (i2, j2), the second output is stored in (i2, j2).

A two-dimensional butterfly computing circuit includes a first butterfly computing circuit, a second butterfly computing circuit, a third butterfly computing circuit taking the first output of the first butterfly computing circuit as the first input and the first output of the second butterfly computing circuit as the second input, and a fourth butterfly computing circuit taking the second output of the first butterfly computing circuit as the first input and the second output of the second butterfly computing circuit as the second input. The first output of the third butterfly computing circuit is taken as the first output. The first output of the fourth butterfly computing circuit is taken as the second output. The second output of the third butterfly computing circuit is taken as a third output. Also, the second output of the fourth butterfly computing circuit is taken as a fourth output.

In the two-dimensional butterfly computing circuit, when the first input is assumed as (i1, j1), the first output is stored in (i1, j1), when the second input is assumed as (i2, j2), the second output is stored in (i2, j2), when the third input is assumed as (i3, j3), the third output is stored in (i3, j3), and when the fourth input is assumed as (i4, j4), the fourth output is stored in (i4, j4).

On the other hand, a computing element inputting a lexicographical order of n×m in number of rectangular regions (i, j) and multiplying nm matrix as tensor products of n×n matrix and m×m matrix, is taken as the tensor product computing element.

At this time, with respect to all of combinations with assumption that i is 0 to 3 and j is 0 to 3, in the first stage constituted of sixteen in number of two-dimensional butterfly computing circuits taking (i, j) as the first input of the first butterfly computing circuit, (i, 7−j) as the second input of the first butterfly computing circuit, (7−i, j) as the first input of the second butterfly computing circuit and (7−i, 7−j) as the second input of the second butterfly computing circuit, the two-dimensional butterfly computing element 1 receives (0, 0), (0, 7), (7, 0) and (7, 7) as inputs. The two-dimensional butterfly computing element 2 receives (0, 1), (0, 6), (7, 1) and (7, 6) as inputs. The two-dimensional butterfly computing element 3 receives (0, 2), (0, 5), (7, 2) and (7, 5) as inputs. The two-dimensional butterfly computing element 4 receives (0, 3), (0, 4), (7, 3) and (7, 4) as inputs. The two-dimensional butterfly computing element 5 receives (1, 0), (1, 7), (6, 0) and (6, 7) as inputs. The two-dimensional butterfly computing element 6 receives (1, 1), (1, 6), (6, 1) and (6, 6) as inputs. The two-dimensional butterfly computing element 7 receives (1, 2), (1, 5), (6, 2) and (6, 5) as inputs. The two-dimensional butterfly computing element 8 receives (1, 3), (1, 4), (6, 3) and (6, 4) as inputs. The two-dimensional butterfly computing element 9 receives (2, 0), (2, 7), (5, 0) and (5, 7) as inputs. The two-dimensional butterfly computing element 10 receives (2, 1), (2, 6), (5, 1) and (5, 6) as inputs. The two-dimensional butterfly computing element 11 receives (2, 2), (2, 5), (5, 2) and (5, 5) as inputs. The two-dimensional butterfly computing element 12 receives (2, 3), (2, 4), (5, 3) and (5, 4) as inputs. The two-dimensional butterfly computing element 13 receives (3, 0), (3, 7), (4, 0) and (4, 7) as inputs. The two-dimensional butterfly computing element 14 receives (3, 1), (3, 6), (4, 1) and (4, 6) as inputs. The two-dimensional butterfly computing element 15 receives (3, 2), (3, 5), (4, 2) and (4, 5) as inputs. The two-dimensional butterfly computing element 16 receives (3, 3), (3, 4), (4, 3) and (4, 4) as inputs.

In FIG. 1, the output points corresponding to the input point 1ij of the first stage is received as 2ij.

On the other hand, the second stage comprises four two-dimensional butterfly computing circuits, in which (4i, 4j) is received as a first input of the first butterfly computing circuit, (4i, 4j+2) is received as second input of the first butterfly computing circuit, (4i+2, 4j) is received as the first input of the second butterfly computing circuit, and (4i+2, 4j+2) is received as the second butterfly computing circuit, with taking the outputs of the first stage as inputs, with respect to all of combinations taking i from 0 to 1 and j from 0 to 1, eight in number of one-dimensional butterfly circuits taking (4i, 2j+1) as the first input and (4i +2, 2j+1) as the second input, and with respect to all combinations of i from 0 to 3 and j from 0 or 1, eight in number of one-dimensional butterfly circuits taking (2i+1, 4j) as the first input and (2i+1, 4j +2) as the second input. The two-dimensional butterfly computing element 17 receives (0, 0), (0, 3), (3, 0), (3, 3) as inputs. The two-dimensional butterfly computing element 18 receives (0, 1), (0, 2), (3, 1), (3, 2) as inputs. The two-dimensional butterfly computing element 19 receives (1, 0), (1, 3), (2, 0), (2, 3) as inputs. The two-dimensional butterfly computing element 17 receives (1, 1), (1, 2), (2, 1), (2, 2) as inputs.

On the other hand, the one-dimensional butterfly computing element 21 receives (0, 4), (3, 4) as inputs. The one-dimensional butterfly computing element 22 receives (0, 5), (3, 5) as inputs. The one-dimensional butterfly computing element 23 receives (0, 6), (3, 6) as inputs. The one-dimensional butterfly computing element 24 receives (0, 7), (3, 7) as inputs. The one-dimensional butterfly computing element 25 receives (1, 4), (2, 4) as inputs. The one-dimensional butterfly computing element 26 receives (1, 5), (2, 5) as inputs. The one-dimensional butterfly computing element 27 receives (1, 6), (2, 6) as inputs. The one-dimensional butterfly computing element 28 receives (1, 7), (2, 7) as inputs. The one-dimensional butterfly computing element 29 receives (4, 0), (4, 3) as inputs. The one-dimensional butterfly computing element 30 receives (5, 0), (5, 3) as inputs. The one-dimensional butterfly computing element 31 receives (6, 0), (6, 3) as inputs. The one-dimensional butterfly computing element 32 receives (7, 0), (7, 3) as inputs. The one-dimensional butterfly computing element 33 receives (4, 1), (4, 2) as inputs. The one-dimensional butterfly computing element 34 receives (5, 1), (5, 2) as inputs. The one-dimensional butterfly computing element 35 receives (6, 1), (6, 2) as inputs. The one-dimensional butterfly computing element 36 receives (7, 1), (7, 2) as inputs.

In FIG. 3, the output point corresponding to the input point 2ij of the second stage set forth above is assumed to be 3ij.

The output of the second stage is received as input of the third stage. The first tensor product computing element 37 receives (0, 0), (0, 4), (4, 0), (4, 4) as input, and performs matrix vector calculation in a 4×4 matrix as a tensor product of the first 2×2 coefficient matrix and the first 2×2 coefficient matrix. The second tensor product computing element 38 receives (0, 2), (0, 6), (4, 2), (4, 6) as input, and performs matrix vector calculation in 4×4 matrix as tensor product of the first 2×2 coefficient matrix and the second 2×2 coefficient matrix. The third tensor product computing element 39 receives (2, 0), (2, 4), (6, 0), (6, 4) as input, and performs matrix vector calculation in a 4×4 matrix as a tensor product of the second 2×2 coefficient matrix and the first 2×2 coefficient matrix. The fourth tensor product computing element 40 receives (2, 2), (2, 6), (6, 2), (6, 6) as input, and performs matrix vector calculation in a 4×4 matrix as a tensor product of the second 2×2 coefficient matrix and the second 2×2 coefficient matrix. The fifth tensor product computing element 41 receives (0, 1), (0, 3), (0, 5), (0, 7), (4, 1), (4, 3), (4, 5), (4, 7) as input, and performs a matrix vector calculation in an 8×8 matrix as a tensor product of the first 2×2 coefficient matrix and the first 4×4 coefficient matrix. The sixth tensor product computing element 42 receives (2, 1), (2, 3), (2, 5), (2, 7), (6, 1), (6, 3), (6, 5), (6, 7) as input, and performs a matrix vector calculation in an 8×8 matrix as a tensor product of the second 2×2 coefficient matrix and the first 4×4 coefficient matrix. The seventh tensor product computing element 43 receives (1, 0), (1, 4), (3, 0), (3, 4), (5, 0), (5, 4), (7, 0), (7, 4) as input, and a matrix vector calculation in an 8×8 matrix as a tensor product of the first 4×4 coefficient matrix and the first 2×2 coefficient matrix. The eighth tensor product computing element 44 receives (1, 2), (1, 6), (3, 2), (3, 6), (5, 2), (5, 6), (7, 2), (7, 6) as input, and a matrix vector calculation in an 8×8 matrix as a tensor product of the first 4×4 coefficient matrix and the second 2×2 coefficient matrix. The ninth tensor product computing element 41 receives (1, 1), (1, 3), (1, 5), (1, 7), (3, 1), (3, 3), (3, 5), (3, 7), (5, 1), (5, 3), (5, 5), (5, 7), (7, 1), (7, 3), (7, 5), (7, 7) as input, and performs a matrix vector calculation in a 16×16 matrix as a tensor product of the first 4×4 coefficient matrix and the first 4×4 coefficient matrix.

In FIG. 1, the output point corresponding to input point 3ij of the third stage is assumed to be 4ij.

In order to execute a two-dimensional DCT calculation, the two-dimensional input data is input to the first stage. The output of the first stage is input to the second stage. The output of the second stage is input to the third stage so that the result of two-dimensional DCT output can be obtained at the third stage.

As set forth above, in the two-dimensional DCT circuit according to the present invention, it becomes possible to execute a high speed two-dimensional DCT calculation while a small scale circuit with maintaining precision in calculation.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed, and equivalents thereof, with respect to the feature set out in the appended claims.

What is claimed is:

1. A two-dimensional discrete cosine transformation circuit for performing an 8 points×8 points two-dimensional discrete cosine transformation, comprising:

assuming i (an integer from 0 to 7) as an address in a vertical direction and j (an integer from 0 to 7) as an address in a horizontal direction, and taking a point storing input data and intermediate data as (i, j), and with respect to all combinations, assuming that i is 0 to 3 and j is 0 to 3, in a first stage calculation means including sixteen two-dimensional butterfly computing circuits receiving (i, j) as a first input of a first butterfly computing circuit, (i, 7−j) as a second input of the first butterfly computing circuit, (7−i, j) as a first input of a second butterfly computing circuit and (7−i, 7−j) as a second input of the second butterfly computing circuit, assuming i and j to be integers from 0 to 7, a second stage calculation means including:

four two-dimensional butterfly circuits receiving (4i, 4j) as a first input of a first butterfly computing circuit, (4i, 4j+2) as a second input of the first butterfly computing circuit, (4i+1, 4j) as a first input of a second butterfly computing circuit and (4i+2, 4j+2) as a second input of the second butterfly computing circuit, with respect to all combinations of i from 0 to 1 and j from 0 to 1, eight one-dimensional butterfly circuits receiving (4i, 2j+1) as a first input and (4i+2, 2j+1) as a second input, with respect to all combinations of i from 0 to 1 and j from 0 to 3, and eight one-dimensional butterfly circuits receiving (2i+1, 4j) as a first input and (2i+1, 4j+2) as a second input, with respect to all combinations of i from 0 to 3 and j from 0 to 1, a third stage calculation means including:

a first tensor product computing element receiving (0, 0), (0, 4), (4, 0) (4, 4) output from the second stage as input of the third stage, and performing a matrix vector calculation in a 4×4 matrix as a tensor product of the first 2×2 coefficient matrix and the first 2×2 coefficient matrix, a second tensor product computing element receiving (0, 2), (0, 6) (r, 12), (4, 6) output from the second stage as input of the third stage, and performing a matrix vector calculation in a 4×4 matrix as a tensor product of the first 2×2 coefficient matrix and the second 2×2 coefficient matrix, a third tensor product computing element receiving (2, 0), (2, 4), (6, 0), (6, 4) output from the second stage as input of the third stage, and performing a matrix vector calculation in a 4×4 matrix as a tensor product of the second 2×2 coefficient matrix and the first 2×2 coefficient matrix, a fourth tensor product computing element receiving (2, 2), (2, 6), (6, 2), (6, 6) output from the second stage, as input of the third stage, and performing a matrix vector calculation in a 4×4 matrix as a tensor product of the second 2×2 coefficient matrix and the second 2×2 coefficient matrix, a fifth tensor product computing element receiving (0, 1), (0, 3), (0, 5), (0, 7), (4, 1), (4, 3), (4, 5), (4, 7) output from the second stage as input of the third stage, and performing a matrix vector calculation in an 8×8 matrix as a tensor product of the first 2×2 coefficient matrix and the first 4×4 coefficient matrix, a sixth tensor product computing element receiving (2, 1), (2, 3), (2, 5), (2, 7), (6, 1), (6, 3), (6, 5), (6, 7) output from the second stage as input of the third stage, and performing a matrix vector calculation in an 8×8 matrix as a tensor product of the second 2×2 coefficient matrix and the first 4×4 coefficient matrix, a seventh tensor product computing element receiving (1, 0), (1, 4), (3, 0), (3, 4), (5, 0), (5, 4), (7, 0), (7, 4) output from the second stage as input of the third stage, and performing a matrix vector calculation of an 8×8 matrix as a tensor product of the first 4×4 coefficient matrix and the first 2×2 coefficient matrix, an eighth tensor product computing element receiving (1, 2), (1, 6), (3, 2), (3, 6), (5, 2), (5, 6), (7, 2), (7, 6) output from the second stage as input of the third stage, and performing a matrix vector calculation in an 8×8 matrix as a tensor product of the first 4×4 coefficient matrix and the second 2×2 coefficient matrix, and a ninth tensor product computing element receiving (1, 1), (1, 3), (1, 5), (1, 7), (3, 1), (3, 3), (3, 5), (3, 7), (5, 1), (5, 3), (5, 5), (5, 7), (7, 1), (7, 3), (7, 5), (7, 7) output from the first stage as input of the third stage, and performing a matrix vector calculation in a 16×16 matrix as a tensor product of the first 4×4 coefficient matrix and the first 4×4 coefficient matrix.

2. A two-dimensional discrete cosine transformation circuit as set forth in claim 1, wherein
   each one-dimensional butterfly computing circuit has two inputs, and outputs a result of an addition of the first input and the second input as a first output and a result of a subtraction of the second input from the first input as a second output, and
   each two-dimensional butterfly computing circuit includes a first butterfly computing circuit, a second butterfly computing circuit, a third butterfly computing circuit receiving the first output of the first butterfly computing circuit as the first input of the first output of the second butterfly computing circuit, and a fourth butterfly computing circuit receiving the second output of the first butterfly computing circuit as the first input and the second output of the second butterfly computing circuit as the second input.

3. A two-dimensional discrete cosine transformation circuit as set forth in claim 1, wherein a computing element inputs a lexicographical order of n ×m in number of rectangular regions (i, j) and multiplies a nm matrix as tensor products of a n×n matrix and a m×m matrix.

4. A two-dimensional discrete cosine transformation circuit as set forth in claim 1, wherein permutation networks are connected between said first stage calculation means, said second stage calculation means and said third stage calculation means.

5. A two-dimensional discrete cosine transformation circuit for performing an 8 points×8 points two-dimensional discrete cosine transformation, comprising:
   first stage calculation means, second stage calculation means receiving an output of said first stage calculation means as input, and third stage calculation means receiving an output of said second stage calculation means as input,
   said first stage calculation means including sixteen two-dimensional butterfly computing circuits,
   each of said two-dimensional butterfly computing circuits including first and second butterfly computing circuits receiving a result of an addition of a first input and a second input as a first output and a result of a subtraction of said second input from said first input as a second output, a third butterfly computing circuit receiving the first output of the first butterfly computing circuit as the first input and the first output of the second butterfly computing circuit as the second input, and receiving a result of an addition of a first input and a second input as a first output and a result of a subtraction of said second input from said first input as a second output, and a fourth butterfly computing circuit receiving the second output of the first butterfly computing circuit as the first input and the second output of the second butterfly computing circuit as the second input and receiving a result of an addition of a first input as a second output, said first output of the third butterfly computing circuit being received as the first output, said first output of the fourth butterfly computing circuit being received as the second output, said second output of the third butterfly computing circuit being received as a third output, and said second output of the fourth butterfly computing circuit being [taken] received as a fourth output,
   assuming i (an integer from 0 to 7) as an address in a vertical direction and j (an integer from 0 to 7) as an address in horizontal direction, and taking a point storing input data and intermediate data as (i, j), with respect to all combinations, assuming that i is 0 to 3 and j is 0 to 3, said first stage calculation means including sixteen two-dimensional butterfly computing circuits receiving (i, j) as the first input of the first butterfly computing circuit, (i, 7−j) as the second input of the first butterfly computing circuit, (7−i, j) as the first input of the second butterfly computing circuit and (7−i, 7−j) as the second input of the second butterfly computing circuit, said first output being stored in (i, j), said second output being stored in (i, 7−j), said third output being stored in (7−i, j) and said fourth output being stored in (7i, 7−j),
   assuming i and j to be integers from 0 to 7, said second stage calculation means including four two-dimensional butterfly computing circuits, eight first one-dimensional butterfly computing circuits and eight second one-dimensional butterfly computing circuits,
   each of said two-dimensional butterfly circuits including first and second butterfly computing circuits, with respect to all combinations of i from 0 to 1 and j from 0 to 1, (4i, 4j) being received as a first input of said first butterfly computing circuit, (4i+2, 4j+2) as a second input of said second butterfly computing circuit,
   each of said first butterfly computing circuits receiving (4i, 2j+1) as the first input and (4i+2, 2j+1) as the second input, with respect to all of combinations of i from 0 or 1 and j from 0 to 3 and storing a first output in (4i, 2j+1) and a second output in (4i+2, 2j+1),
   each of said second butterfly computing circuits receiving (2i+1, 4j) as the first input and (2i+1, 4j+2) as the second input, with respect to all combinations of i from 0 to 3 and j from 0 or 1, and storing a first output in (2i+1, 4j) and a second output in (2i+1, 4j+2),
   said third stage calculation means including:
   a first tensor product computing element receiving (0, 0), (0, 4), (4, 0), (4, 4) output from the second stage as input of the third stage, and performing a matrix vector calculation in a 4×4 matrix as a tensor product of the first 2×2 coefficient matrix and the first 2×2 coefficient matrix,
   a second tensor product computing element receiving (0, 2), (0, 6), (4, 2) output from the second stage as input of the third stage, and performing a matrix vector calculation in a 4×4 matrix as a tensor product of the first 2×2 coefficient matrix and the second 2×2 coefficient matrix,
   a third tensor product computing element receiving (2, 0), (2, 4), (6, 0), (6, 4) output from the second stage as input of the third stage, and performing a matrix vector calculation in a 4×4 matrix as a tensor product of the second 2×2 coefficient matrix and the first 2×2 coefficient matrix,
   a fourth tensor product computing element receiving (2, 2), (2, 6) (6, 2), (6, 6) output from the second stage as input of the third stage, and performing a matrix vector calculation in a 4×4 matrix as a tensor product of the second 2×2 coefficient matrix and the second 2×2 coefficient matrix,
   a fifth tensor product computing element receiving (0, 1), (0, 3), (0, 5), (0, 7), (4, 1) (4, 3), (4, 5), (4, 7) output from the second stage as input of the third stage, and performing a tensor product of the first 2×2 coefficient matrix and the first 4×4 coefficient matrix,
   a sixth tensor product computing element receiving (2, 1), (2, 3), (2, 5), (2, 7), (6, 1), (6, 3), (6, 5), (6, 7) output from the second stage as input of the third stage, and performing a matrix vector calculation in an 8×8 matrix as a tensor product of the second 2×2 coefficient matrix and the first 4×4 coefficient matrix,
   a seventh tensor product computing element receiving (1, 0), (1, 4), (3, 0), (3, 4), (5, 0), (5, 4), (7, 0), (7, 4)

output from the second stage as input of the third stage, and performing a matrix vector calculation in an 8×8 matrix as a tensor product of the first 4×4 coefficient matrix and the first 2×2 coefficient matrix, an eighth tensor product computing element receiving (1, 2), (1, 6), (3, 2), (3, 6), (5, 2), (5, 6), (7, 2), (7, 6) output from the second stage as input of the third stage and performing a matrix vector calculation in an 8×8 matrix as a tensor product of the first 4×4 coefficient matrix and the second 2×2 coefficient matrix, and a ninth tensor product computing element receiving (1, 1), (1, 3), (1, 5), (1, 7), (3, 1), (3, 3), (3, 5), (3, 7), (5, 1), (5, 3), (5, 5), (5, 7), (7, 1), (7, 3), (7, 5), (7, 7) output from the first stage as input at the third stage, and performing a matrix vector calculation in a 16×16 matrix as a tensor product of the first 4×4 coefficient matrix and the first 4×4 coefficient matrix.

6. A two-dimensional discrete cosine transformation process for performing an 8 points×8 points two-dimensional discrete cosine transformation, comprising:

a first data processing step, wherein:
assuming i (an integer from 0 to 7) as an address in a vertical direction and j (an integer from 0 to 7) as an address in a horizontal direction, and taking a point storing input data and intermediate data as (i, j), and with respect to all combinations, assuming that i is 0 to 3 and j is 0 to 3, sixteen two-dimensional butterfly computing circuits receive (i, j) as a first input of a first butterfly computing circuit, (i, 7−j) as a second input of the first butterfly computing circuit, (7−i, j) as a first input of a second butterfly computing circuit and (7−i, 7−j) as a second input of the second butterfly computing circuit;

a second data processing step, wherein:
assuming i and j to be integers from 0 to 7, four two-dimensional butterfly circuits receive (4i, 4j) as a first input of a first butterfly computing circuit, (4i, 4j+2) as a second input of the first butterfly computing circuit, (4i+1, 4j) as a first input of the second butterfly computing circuit and (4i +2, 4j+2) as a second input of the second butterfly computing circuit, with respect to all combinations of i from 0 to 1 and j from 0 to 1, and eight one-dimensional butterfly circuits receive (4i, 2j+1) as a first input and (4i+2, 2j+1) as a second input, with respect to all combinations of i from 0 to 1 and j from 0 to 3, and eight one-dimensional butterfly circuits receive (2i +1, 4j) as a first input and (2i+1, 4j+2) as a second input, with respect to all combinations of i from 0 to 3 and j from 0 to 1; and a third data processing step, wherein:
a first tensor product computing element receives (0, 0), (0, 4), (4, 0), (4, 4) output from the second step as input of the third step, and performs a matrix vector calculation in a 4×4 matrix as a tensor product of the first 2×2 coefficient matrix and the first 2×2 coefficient matrix, a second tensor product computing element receives (0, 2), (0, 6), (r, 2), (4, 6) output from the second step as input of the third step, and performs a matrix vector calculation in a 4×4 matrix as a tensor product of the first 2×2 coefficient matrix and the second 2×2 coefficient matrix, a third tensor product computing element receives (2, 0), (2, 4), (6, 0), (6, 4) output from the second step as input of the third step, and performs a matrix vector calculation in a 4×4 matrix as a tensor product of the second 2×2 coefficient matrix and the first 2×2 coefficient matrix, a fourth tensor product computing element receives (2, 2), (2, 6), (6, 2), (6, 6) output from the second step, as input of the third step, and performs a matrix vector calculation in a 4×4 matrix as a tensor product of the second 2×2 coefficient matrix and the second 2×2 coefficient matrix, a fifth tensor product computing element receives (0, 1), (0, 3), (0, 5), (0, 7), (4, 1), (4, 3), (4, 5), (4, 7) output from the second step as input of the third step, and performs a matrix vector calculation in an 8×8 matrix as a tensor product of the first 2×2 coefficient matrix and the first 4×4 coefficient matrix, a sixth tensor product computing element receives (2, 1), (2, 3), (2, 5), (2, 7), (6, 1), (6, 3), (6, 5), (6, 7) output from the second step as input of the third step, and performs a matrix vector calculation in an 8×8 matrix as a tensor product of the second 2×2 coefficient matrix and the first 4×4 coefficient matrix, a seventh tensor product computing element receives (1, 0), (1, 4), (3, 0), (3, 4), (5, 0), (5, 4), (7, 0), (7, 4) output from the second step as input of the third step, and performs a matrix vector calculation of an 8×8 matrix as a tensor product of the first 4×4 coefficient matrix and the first 2×2 coefficient matrix, an eighth tensor product computing element receives (1, 2), (1, 6), (3, 2), (3, 6), (5, 2), (5, 6), (7, 2), (7, 6) output from the second step as input of the third step, and performs a matrix vector calculation in an 8×8 matrix as a tensor product of the first 4×4 coefficient matrix and the second 2×2 coefficient matrix, and a ninth tensor product computing element receives (1, 1), (1, 3), (1, 5), (1, 7), (3, 1), (3, 3), (3, 5), (3, 7), (5, 1), (5, 3), (5, 5), (5, 7), (7, 1), (7, 3), (7, 5), (7, 7) output from the first step as input of the third step, and performs a matrix vector calculation in a 16×16 matrix as a tensor product of the first 4×4 coefficient matrix and the first 4×4 coefficient matrix.

7. A two-dimensional discrete cosine transformation process as set forth in claim 6, wherein:

each one-dimensional butterfly circuit includes two inputs to output a result of an addition of the first input and the second input as a first output and a result of a subtraction of the second input from the first input as a second output, and each two-dimensional butterfly circuit includes a first butterfly circuit, a second butterfly circuit, a third butterfly circuit receiving as inputs a first output of the first butterfly circuit and a first output of the second butterfly circuit, and a fourth butterfly circuit receiving as inputs a second output of the first butterfly circuit and a second output of the second butterfly circuit.

* * * * *